United States Patent
Sebesta et al.

(10) Patent No.: US 8,161,532 B2
(45) Date of Patent: Apr. 17, 2012

(54) OPERATING SYSTEM INDEPENDENT ARCHITECTURE FOR SUBSCRIPTION COMPUTING

(75) Inventors: David J. Sebesta, Redmond, WA (US); Shon Schmidt, Seattle, WA (US); William J. Westerinen, Issaquah, WA (US); Todd Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1167 days.

(21) Appl. No.: 11/696,346

(22) Filed: Apr. 4, 2007

(65) Prior Publication Data

US 2008/0250237 A1    Oct. 9, 2008

(51) Int. Cl.
*G06F 7/04* (2006.01)
*G06F 21/00* (2006.01)
*H04L 29/06* (2011.01)
*H04N 7/167* (2006.01)

(52) U.S. Cl. ............... 726/5; 713/151; 380/231; 705/52

(58) Field of Classification Search .......... 713/150–153, 713/160; 726/12, 2–7, 26–27; 705/50–52; 380/200–205, 210, 231–234, 255–257, 259–263
See application file for complete search history.

(56) References Cited

U.S. PATENT DOCUMENTS

| | | | | |
|---|---|---|---|---|
| 6,058,434 | A * | 5/2000 | Wilt et al. | 719/310 |
| 6,981,140 | B1 * | 12/2005 | Choo | 713/164 |
| 7,304,587 | B2 * | 12/2007 | Boaz | 340/870.02 |
| 7,441,114 | B2 * | 10/2008 | Collier et al. | 713/152 |
| 2002/0059193 | A1 * | 5/2002 | Decime | 707/3 |
| 2002/0173977 | A1 * | 11/2002 | Dutta | 705/1 |
| 2002/0184287 | A1 | 12/2002 | Nunally | |
| 2003/0027549 | A1 * | 2/2003 | Kiel et al. | 455/405 |
| 2003/0135380 | A1 * | 7/2003 | Lehr et al. | 705/1 |
| 2003/0156719 | A1 * | 8/2003 | Cronce | 380/256 |
| 2003/0200459 | A1 * | 10/2003 | Seeman | 713/200 |
| 2004/0098313 | A1 * | 5/2004 | Agrawal et al. | 705/26 |
| 2004/0111507 | A1 * | 6/2004 | Villado et al. | 709/224 |
| 2004/0236962 | A1 * | 11/2004 | Wong et al. | 713/201 |

(Continued)

FOREIGN PATENT DOCUMENTS

WO    WO-2004093405 A1    10/2004

OTHER PUBLICATIONS

Rant, Jon. "FlexGo: Security Seeds a New Business Model," Enterprise Server Systems, May 31, 2006.*

(Continued)

*Primary Examiner* — Edward Zee
*Assistant Examiner* — Darren B Schwartz
(74) *Attorney, Agent, or Firm* — L. Alan Collins; Collins & Collins Intellectual, LLC

(57) ABSTRACT

A system for managing a subscription-based computer independent of an operating system of the computer may include a security module that accesses, decrements, and stores subscription data during operation of the subscription-based computer. Additionally, the system may include a network module in communication with the security module and comprising a network stack, a web server, and a user interface in an operating system independent format. A web browser of the computer may request the user interface from the network stack. The interface may be populated with the subscription data, and a network driver may retrieve the populated user interface from the network module. The populated interface may then be sent to the web server to be served back to the requesting web browser.

16 Claims, 4 Drawing Sheets

U.S. PATENT DOCUMENTS

| | | | |
|---|---|---|---|
| 2004/0254885 A1* | 12/2004 | Gernold | 705/51 |
| 2005/0034166 A1 | 2/2005 | Kim et al. | |
| 2005/0060390 A1* | 3/2005 | Vakil et al. | 709/220 |
| 2006/0098646 A1 | 5/2006 | Sahita et al. | |
| 2006/0100011 A1 | 5/2006 | Morrow et al. | |
| 2006/0287080 A1 | 12/2006 | Bychkov | |
| 2007/0011272 A1 | 1/2007 | Bakke et al. | |
| 2007/0014245 A1 | 1/2007 | Aloni et al. | |
| 2007/0050624 A1 | 3/2007 | Lord et al. | |
| 2007/0061588 A1 | 3/2007 | Newcombe | |
| 2007/0088846 A1* | 4/2007 | Adams et al. | 709/237 |
| 2008/0147671 A1* | 6/2008 | Simon et al. | 707/10 |

OTHER PUBLICATIONS

Maccabe, Arthur, et al. "Experience in Offloading Protocol Processing in a Programmable NIC," Proceedings of the IEEE International Conference on Cluster Computing, 2002.*

"Embedded Network Connectivity," Analog Devices Inc, 2005.*

Written Opinion for PCT/US2008/059039 mailed Jul. 28, 2008.

International Search Report based on International Application No. PCT/US2008/059039—Filed Apr. 1, 2008; Date of Mailing: Jul. 28, 2008.

* cited by examiner

188

OPERATING SYSTEM INDEPENDENT ARCHITECTURE FOR SUBSCRIPTION COMPUTING

BACKGROUND

This Background is intended to provide the basic context of this patent application and is not intended to describe a specific problem to be solved.

Pay-as-you-go or pay-per-use and subscription business models have been used in many areas of commerce, from cellular telephones to commercial launderettes. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates their account, and while the cellular telephone may power up, calls cannot be made because the service provider will not allow them. The deactivated phone has no "salvage" value, because the phone will not work elsewhere and the component parts are not easily salvaged nor do they have a significant street value. When the account is brought current, the service provider will reconnect the device to network and allow the subscriber to make calls.

This model works well when the service provider, or other entity taking the financial risk of providing subsidized hardware, has tight control on the use of the hardware and when the device has little salvage value. This business model does not work well when the hardware has substantial uses outside the service provider's span of control. Thus, a typical personal computer does not meet these criteria since a personal computer may have substantial uses beyond an original intent and the components of a personal computer, e.g. a display or disk drive, may have a significant salvage value.

In a typical pay-as-you-go computing system, a user purchases a code that is redeemable for a number of computing hours at a specially-equipped electronic device. The user may add time to an existing account balance by purchasing additional codes and entering them through a user interface executing on the device operating system (OS). To ensure security of the user's time balance and securely track consumed time, the OS network stack performs all network traffic, for example, establishing a connection with a provisioning server which replenishes the device with purchased time. The dependency of the system on the device's OS requires that all provisioning applications be written for a specific OS.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system for managing a subscription-based computer independent of an operating system of the computer may include a security module that accesses, decrements, and stores subscription data during operation of the subscription-based computer. Additionally, the system may include a network module in communication with the security module and comprising a network stack, a web server, and a user interface in an operating system independent format. A web browser of the computer may request the user interface from the network stack. The interface may be populated with the subscription data, and a network driver may retrieve the populated user interface from the network module. The populated interface may then be sent to the web server to be served back to the requesting web browser.

SPECIFICATION

Figure 1:
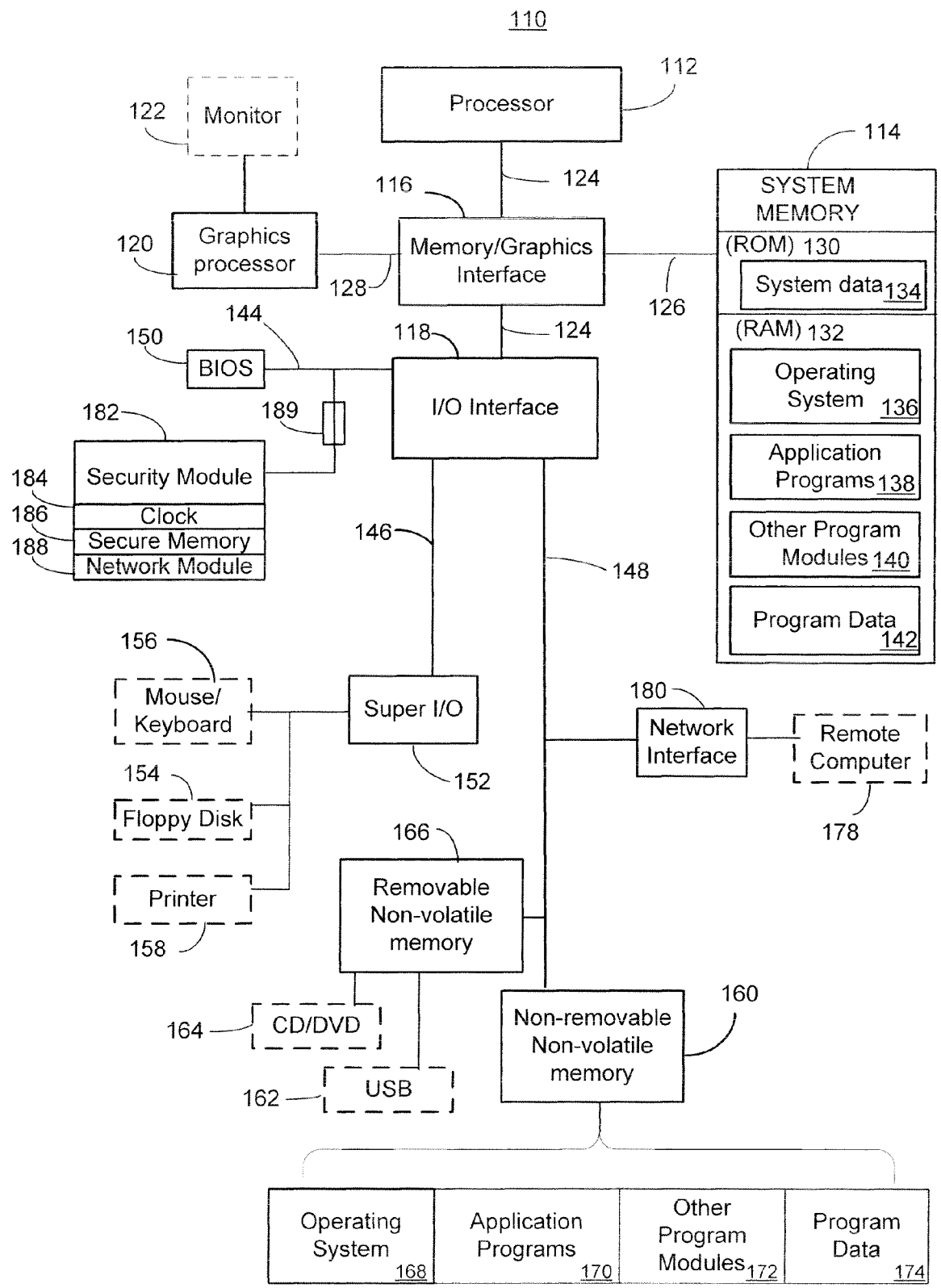
FIG. 1 is an illustration of a computer that implements a method or includes an apparatus for enabling a subscription-based or pay-per-use computer system independently of an OS.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader. It is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the present invention's principles and concepts, further discussion of such software and ICs, if any, will be limited to the essentials with respect to the preferred embodiments.

Many prior-art high-value computers, personal digital assistants, organizers, and the like, are not suitable for secure subscription use without modification. The ability to enforce a contract requires a service provider, i.e., an "ISP" or other enforcement entity, to be able to affect a device's operation even though the device may not be connected to the service provider, e.g. connected to the Internet. A first stage of enforcement may include a simple pop up or other graphical interface warning, indicating the terms of the contract are nearing a critical point. A second stage of enforcement, for example, after pay-per-use minutes have expired or a subscription period has lapsed, may be to present a system modal user interface for adding value and restoring service. A provider's ultimate leverage for enforcing the terms of a subscription or pay-as-you go agreement is to disable the device. Such a dramatic step may be appropriate when it appears that the user has made a deliberate attempt to subvert the metering or other security systems active in the device.

Uses for the ability to place an electronic device into a limited function mode may extend beyond subscription and pay-per-use applications. For example, techniques for capacity consumption could be used for licensing enforcement of an operating system or individual applications.

FIG. 1 illustrates a logical view of a computing device in the form of a computer 110 that may be used in a pay-per-use or subscription mode. For the sake of illustration, the computer 110 is used to illustrate the principles of the instant disclosure. However, such principles apply equally to other electronic devices, including, but not limited to, cellular telephones, personal digital assistants, media players, appliances, gaming systems, entertainment systems, set top boxes, and automotive dashboard electronics, to name a few. With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 112, a system memory 114, a memory/graphics interface 116, also known as a Northbridge chip, and an I/O interface 118, also known as a Southbridge chip. The memory 114 and a graphics processor 120 may be coupled to the memory/graphics interface 116. A monitor 122 or other graphic output device may be coupled to the graphics processor 120.

A series of system busses may couple various system components including a high speed system bus 124 between the processor 112, the memory/graphics interface 116 and the I/O interface 118, a front-side bus 126 between the memory/graphics interface 116 and the system memory 114, and an advanced graphics processing (AGP) bus 128 between the memory/graphics interface 116 and the graphics processor 120. The system bus 124 may be any of several types of bus structures including, by way of example, and not limitation, an Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

Computer 110 typically includes a variety of computer readable media. Computer readable media may be any available media that is accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 114 includes computer storage media in the form of volatile and/or nonvolatile memory such as read only memory (ROM) 130 and random access memory (RAM) 132. The system ROM 130 may contain permanent system data 134, such as identifying and manufacturing information. In some embodiments, a basic input/output system (BIOS) may also be stored in system ROM 130. RAM 132 typically contains data and/or program modules that are immediately accessible to and/or presently being operated on by processor 112. By way of example, and not limitation, FIG. 1 illustrates operating system 136, application programs 138, other program modules 140, and program data 142.

The I/O interface 118 may couple the system bus 124 with a number of other busses 144, 146, and 148 that join a variety of internal and external devices to the computer 110. A serial peripheral interface (SPI) bus 144 may connect to a basic input/output system (BIOS) memory 150 containing basic routines to help transfer information between elements within computer 110. For example, the BIOS may execute during start-up.

A super input/output chip 152 may be used to connect to a number of 'legacy' peripherals, such as floppy disk 154, keyboard/mouse 156, and printer 158. In one embodiment, the super I/O chip 152 is connected to the I/O interface 118 with a low pin count (LPC) bus 146. The super I/O chip is widely available in the commercial marketplace.

In one embodiment, bus 148 may be a Peripheral Component Interconnect (PCI) bus, or a variation thereof, may be used to connect higher speed peripherals to the I/O interface 118. A PCI bus may also be known as a Mezzanine bus. Variations of the PCI bus include the Peripheral Component Interconnect-Express (PCI-E) and the Peripheral Component Interconnect Extended (PCI-X) busses, the former having a serial interface and the latter being a backward compatible parallel interface. In other embodiments, bus 148 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 nonvolatile magnetic media. Removable media, such as a universal serial bus (USB) memory 162 or CD/DVD drive 164 may be connected to the PCI bus 148 directly or through an interface 166. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 160 is illustrated as storing operating system 168, application pro grams 170, other program modules 172, and program data 174. Note that these components can either be the same as or different from operating system 136, application programs 138 other program modules 140, and program data 142. Operating system 168, application programs 170, other program modules 172, and program data 174 are given different numbers here to illustrate that, at a minimum, they are different copies. A user may enter commands and information into the computer 110 through input devices such as a mouse/keyboard 156 or other input device combination. Other input devices (not shown) may include a microphone, joystick, game pad, satellite dish, scanner, or the like. These and other input devices are often connected to the processing unit 112 through one of the I/O interface busses, such as the SPI 144, the LPC 146, or the PCI 148, but other busses may be used. In some embodiments, other devices may be coupled to parallel ports, infrared interfaces, game ports, and the like (not depicted), via the super I/O chip 152.

The computer 110 may operate in a networked environment using logical connections to one or more remote computers, such as a remote computer 178 via a network interface controller (NIC) 180. The remote computer 178 may be a personal computer, a server, a router, a network PC, a peer device or other common network node, and typically includes many or all of the elements described above relative to the computer 110. The logical connection depicted in FIG. 1 may include a local area network (LAN), a wide area network (WAN), or both, but may also include other networks. Such networking environments are commonplace in offices, enterprise-wide computer networks, intranets and the Internet.

In some embodiments, the network interface may use a modem (not depicted) when a broadband connection is not available or is not used. It will be appreciated that the network connection shown is exemplary and other means of establishing a communications link between the computers may be used.

The computer 110 may also include a security module (SM) 182. The SM 182 may be enabled to perform security monitoring, pay-per-use and subscription usage management, and policy enforcement related to terms and conditions associated with paid use. The SM 182 may be particularly suited to securely enabling a computer 110 in a subsidized purchase business model. The SM 182 may be a set of virtualized containers executing on the processor 112 or real containers such as an embedded processor or controller. In one embodiment, the SM 182 is connected to I/O Interface 118 on the SPI bus 144. In another embodiment, the SM 182 may be embodied in the processing unit 112, as a standalone component, or in a hybrid, such as a multi-chip module. A clock 184 may be incorporated into the SM 182 to help ensure tamper resistance. To allow user management of local time setting, including daylight savings or movement between time zones, the clock 184 may maintain its time in a coordinated universal time (UTC) format and user time may be calculated using a user-settable offset. The SM 182 may also include a cryptographic function (not depicted).

Additionally, the SM may include firmware or other form of secure memory 186. The secure memory 186 may include routines or applications that may facilitate the secure operation of the computer 110 through the security module 182. Additionally, the secure memory 186 may include any other data that may be securely accessed, stored, or modified without unauthorized tampering. In one embodiment, the secure memory 186 includes a lower provisioning module (LPM) that manages the allocation of the usage time and policy enforcement. The LPM of the secure memory 186 may act as a secure execution environment of the SM 182 and may account for a user's prepaid access time or subscription information. Additionally, the LPM may be described by U.S. patent application Ser. No. 10/988,907, and U.S. patent application Ser. No. 11/612,433 the entire disclosure of which is hereby incorporated by reference.

The secure memory 186 may also include a cryptographic core that may act as an authentication device for all communication between the SM 182 and other devices. For example, the cryptographic core of the execution unit 225 may provide a processing and encryption subsystem of the security module 182 that reaches a suitable Common Criteria Evaluation Assurance Level to ensure that the computer 110 and any communication with the SM 182 may not be compromised.

The memory 186 may also include storage for system-critical items such as a BIOS for a computer or other electronic device in which the SM 182 is operating. The secure memory 186 may also include memory dedicated to the operation of the SM 182 itself, such as storage, for example, for storing metering code to access and decrement subscription data. The secure memory 186 may also act as a repository for subscription or pay-per-use data such as data representing an amount of access time. With the LPM, the access time data may be decremented during computer 110 use. Further, an application for use in providing functionality during limited operation modes, such as a "hardware limited mode," (HLM) may also be stored in the secure memory 186. To support a limited operation mode, a second BIOS, and optionally, an alternate copy of the second BIOS, may also be stored in the secure memory 186. The second BIOS may be used for booting the computer or other electronic device incorporating the SM 182. The second BIOS may be activated as a secure boot environment to replace the standard BIOS 150 to enforce a subscription or other security policy. Furthermore, the SM 182 may also have an ability to force a system reset at any time which may ensure that pay per use or subscription terms are met, as well as provide a clean environment to start with either a normal or a restricted operation BIOS.

The SM 182 may also include a network module 188 in communication with the LPM. The network module 188 may include a network stack that may control all network traffic to the OS 136, 168 through the SM 182. For example, the network module 188 may be implemented in a 32-bit RISC Microcontroller. One example of a suitable microcontroller may be the LPC2378 microcontroller manufactured by NXP Semiconductors of Eindhoven, The Netherlands. Additionally, the network module 188 may include a web server within the SM 182 that may host a number of interfaces that allow secure management of a subscription-based computing system. In one embodiment, the network module 188 includes a number of user interfaces as web pages in a standard publishing format that are served to the user through the SM 182. The standard publishing format may be Hypertext Markup Language or any similar format. The network module 182 may also include a cryptographic module or function that may encrypt all communications between an internet service provider (ISP) and the computer 100 using a secret key stored in the secure memory 186. In another embodiment, the network module 188 manages a network stack and provides packet filtering and redirection within a subscription-based or pay-per-use computing system. The network module may be in communication with or act as a substitute for the LPM and/or an upper provisioning module (UPM) as described in U.S. patent application Ser. No. 10/988,907, and U.S. patent application Ser. No. 11/612,433.

Figure 2:
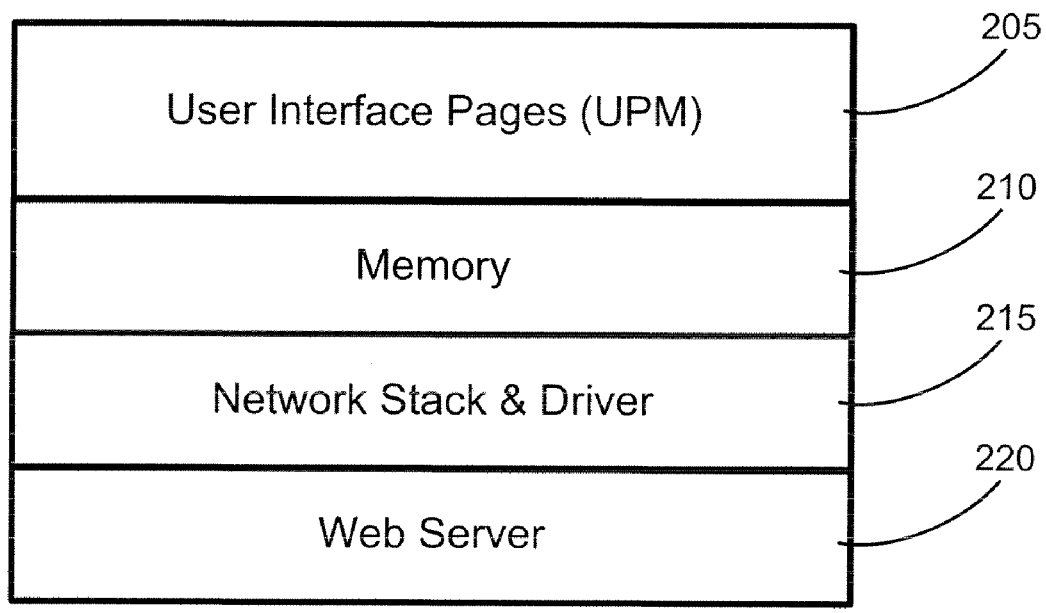
FIG. 2 is a simplified and representative block diagram of a network module of an OS independent secure computing system.

With reference to FIG. 2, the network module 188 may be in communication with the SM 182. In one embodiment, the network module includes a UPM in the form of a number of web pages in an OS independent format 205, a memory 210, a network stack and driver 215, and a web server 220. In one embodiment, the UPM 205 is a series of web pages that allow a user to add access time and perform other subscription account administrative functions. The UPM 205 may be hosted inside the web server 220 and may invoke the LPM, as previously discussed, to retrieve information to be presented on the web sites that are served by the web server 220 to a web browser executing on the OS. In a further embodiment, the web sites invoke the LPM to retrieve a current time balance and provide packets to provision access time from the SM 182 to the computer 110. The network stack and driver 215 may make a network port available to the OS during operation of the computer 110. In one embodiment, the network stack and driver 215 determines if incoming requests are destined for the web server 220 based on an internet protocol (IP) address and a port of the incoming packet. For example, if the incoming packet is for the web server 220, then the network stack and driver 215 may forward the packet to the web server 220 unencrypted. However, if the incoming packet is destined for another location, i.e., a remote computer 178, then the network stack and driver 215 may encrypt the packet and send it to its destination. In one embodiment, the network stack and driver 215 may provide a processing and encryption subsystem of the module 188 that reaches a suitable Common Criteria Evaluation Assurance Level to ensure that the module 188 and any communication between the computer 110 and an outside device 178 may not be compromised. In a further embodiment, the network stack and driver 215 manages all communication from the computer 110 to a system that manages user subscription information, as further discussed in relation to FIG. 3.

Other embodiments may include an activation fuse 189. The fuse 189 may be any type of device or firmware that may be selectively activated from an inactive state to enable communication between the I/O Interface 118 and the SM 182. When deactivated, i.e., when the fuse 189 does not maintain a connection between the SM 182 and the I/O Interface 118, the computer 110 may not operate as a subscription-based computing device, but rather, as a normal PC. However, when activated, i.e., when the fuse 189 maintains a connection between the SM 182 and the I/O Interface 118, the computer may operate as a subscription-based computing device. In one embodiment, the fuse 189, once activated to enable communication between the SM 182 and other components and devices, may not be deactivated. For example, the computer 110 may be manufactured initially to operate as a normal, non-subscription-based PC and may later be activated by an underwriter or subscriber to operate as a subscription-based PC. Therefore, while the fuse is activated and upon boot-up, connection, or disconnection of the device 188, firmware of the SM 182 (i.e., the previously-described local provisioning module of the secure memory 186) may seek subscription or usage time stored in the metered computing device 188.

Figure 3:
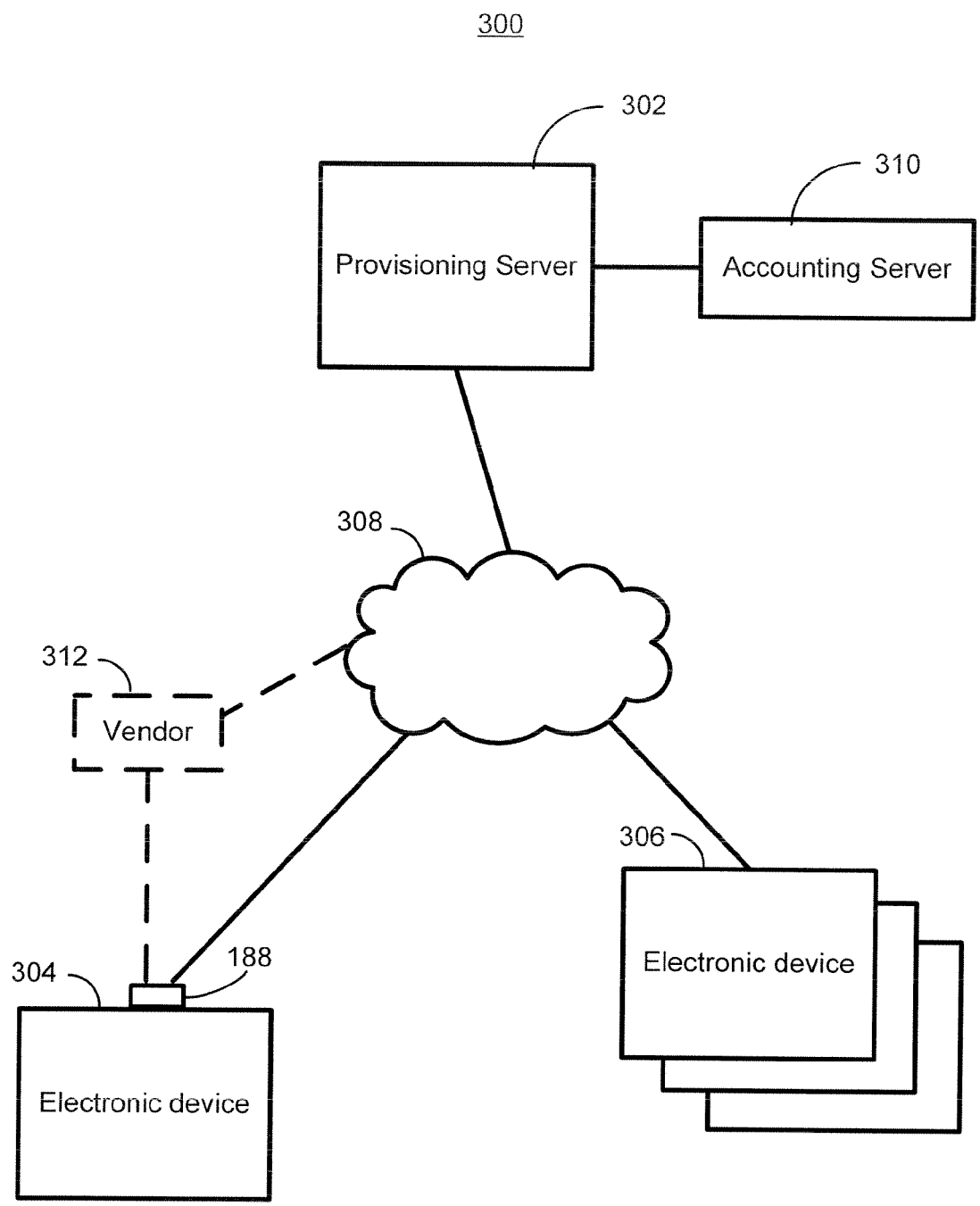
FIG. 3 is a simplified and exemplary block diagram of a system supporting a pay-per-use and subscription computing business model.

FIG. 3 is a simplified and exemplary block diagram of a system 300 supporting pay-per-use and subscription usage of a computer or other electronic device. A provisioning server 302 may serve as a trusted endpoint for provisioning requests from one or more electronic devices participating in the pay-per-use business ecosystem. One electronic device 304 may be similar to computer 110 of FIG. 1 including the SM 182 and network module 188. Other electronic devices 306 may perform substantially the same as the exemplary device 304. Communication between the provisioning server 302 and the electronic device 304 may be accomplished through a network 308 to a network module 188 of the computer 110 and that may include landline, wireless, or broadband networks, or other networks known in the art.

An accounting server 310 may be linked to the provisioning server 302 and may maintain account data corresponding to the electronic device 304. Account data may also be stored at the SM 182. The accounting server 310 may also serve as a clearinghouse for financial transactions related to the electronic device 304, such as, replenishing or adding value to a pay-per-use account maintained on the accounting server 310. In one embodiment, the electronic device 304, communicating through the network module 188, establishes a connection with a vendor 312 that communicates with the accounting server 310. In another embodiment, the device 304 establishes a connection directly with the accounting server 310 through the module 188. During use, an LPM within the SM 182 of the device 304 may decrement access data stored in the secure memory 186. The access data may be any value, access time for operating any secure OS or application of the electronic device 304, 306, or any other data that may be recorded at the accounting server 310 and stored at the SM 182 for use with a computer 110. In a further embodiment, the user may purchase a generic amount of time that may be used for any OS, application, or any other activity at a secure electronic device 304. Of course, many other types of data, access time, and subscription information may be purchased and stored at the SM 182 or an accounting server 310.

Figure 4:
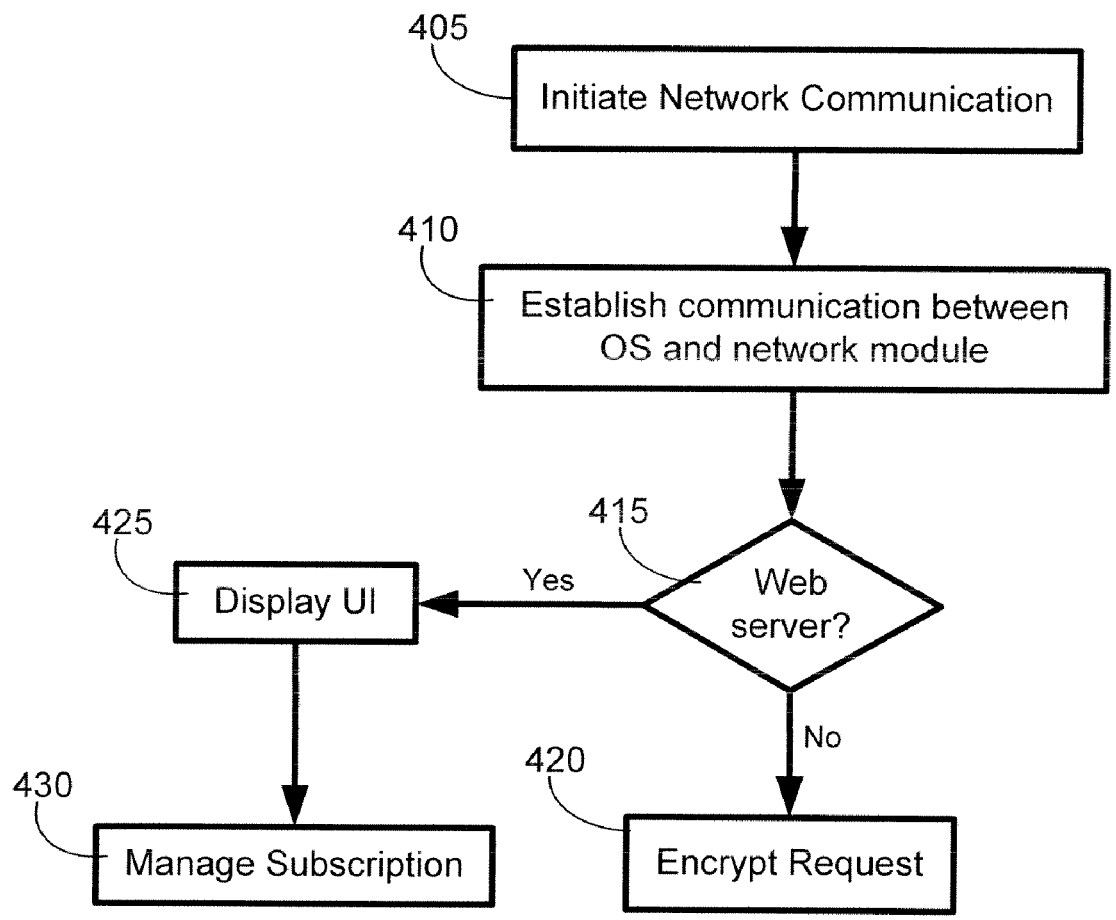
FIG. 4 is a simplified and exemplary block diagram of a method for managing subscription and other information of a subscription-based or pay-per-use computer independently of an operating system of the computer.

FIG. 4 is a simplified and exemplary block diagram of a method 400 for implementing an operating system independent architecture for secure, pay-as you-go or subscription-based computing. At block 405, a user desiring to operate a computer 110 with a security module 182 including the network module 188 may initiate network communications with the computer 110. In one embodiment, the user initiates a web browser executing on the OS 136, 168 of the computer 110.

At block 410, the user may give instructions to the browser to access the web server 220 hosted by the network module 188. In one embodiment, the user enters a network address of the network module 188 residing on the computer 110.

At block 415, the network stack and driver 215 may determine if the incoming communication from the web browser is destined for the web server 220 or to an external computer 178. If the request is for an external computer or other network device, at block 420, the network stack and driver 215 may encrypt the request before sending it out to a remote computer 178. In one embodiment, the network stack and driver 215 encrypts outgoing requests using a secret key stored in the secure memory 186. In another embodiment, a cryptographic module of the SM 182 may encrypt all outgoing requests. For example, the network stack and driver 215 may encrypt the message at the network or packet processing layer of network communication using Internet Protocol Security (IPSec) that may be initialized by a secret key of the SM 182 or stored in the memory 210. In a further embodiment, a user's access to anything outside the computer 110, i.e., any internet use, will only be accepted at an ISP that is able to decrypt the encrypted message. For example, any ISP not having the key or other cryptographic information used at block 420 may not communicate with the originating computer 110. Encrypting communications from the network module 188 to any outside entity may result in the computer 110 being "tightly coupled" to only those ISPs that are able to decrypt the messages.

If, at block 415, the request is for the web server 220, it may be forwarded with or without encryption. At block 425, the web server 220 may retrieve one of the web pages 205 to display subscription or other information to the user. As previously described, the user interface web pages 205 may function as the Upper Provisioning Module disclosed by U.S. patent application Ser. No. 10/988,907, and U.S. patent application Ser. No. 11/612,433. In one embodiment, the web pages 205 retrieve subscription and other data from the LPM and the system 300 for display to the user. For example, the web pages may invoke the LPM to display a current account balance or provide a provisioning packet from the server 302.

At block 430, using the web pages 205 served to the user in block 415, the user may manage the metering of their machine or other subscription functions. In one embodiment, because the network module 188 serves a user interface 205 in a universal format, i.e., HTML, metering and provisioning of access time to a computer 110 in a subscription or pay-as-you-go system is not dependent on the underlying OS. Thus, a network module 188 may allow a user to manage a subscription-based computing system 110 independently from the OS 136, 168.

Many modifications and variations may be made in the techniques and structures described and illustrated herein without departing from the spirit and scope of the present invention. Accordingly, it should be understood that the methods and apparatus described herein are illustrative only and are not limiting upon the scope of the invention

The invention claimed is:

1. A system for managing a subscription-based computer independent of an operating system of the subscription-based computer, the system comprising:
a processor of the subscription-based computer;
a security module residing on the subscription-based computer including a computer-readable storage medium having computer executable instructions executed by the processor of the subscription-based computer, the instructions comprising:
a provisioning module for accessing, decrementing, and storing subscription data during operation of the subscription-based computer, wherein subscription data includes an amount of access time to enable operation of the subscription-based computer; and
a network module residing on the computer, in communication with the security module, the network module including a network stack controlling all network traffic to the operating system through the security module, a web server, and a user interface web page, the user interface web page in an operating system independent format, the network module including a computer-readable storage medium having computer executable instructions executed by the processor of the subscription-based computer, the instructions comprising:
a communication module for receiving a request from a web browser, determining if the request is for the user interface web page at the network stack or an external computer, the request originating from an operating system of the computer, and when the request is for the user interface web page:
a population module populates the user interface web page with the subscription data accessed by the provisioning module,
a network driver retrieves the user interface web page from the network module and sends the populated user interface web page to the web server, and
a server module serves, from the web server, the populated user interface web page to the operating system; and
when the request is for the external computer, an encryption module encrypts the request and sends the request to the external computer.

2. The system of claim 1, wherein the subscription data includes a number of subscription units.

3. The system of claim 1, wherein the encryption module includes a secure memory storing an encryption key.

4. The system of claim 3, wherein the encryption module communicates with the security module to encrypt the request with the encryption key, the request originating from the operating system to the external computer.

5. The system of claim 4, wherein the encryption module encrypts the request at a network level of the network stack.

6. The system of claim 1, wherein the user interface web page format is HTML.

7. The system of claim 1, wherein the computer includes a web browser executing on the operating system of the computer; and
wherein the communication module includes computer executable instructions for receiving the request for the user interface web page from the web browser.

8. A method for managing subscription data of a subscription-based computer independently of an operating system of the computer, the method comprising:
decrementing and storing subscription data during operation of the subscription-based computer, wherein subscription data includes an amount of access time to enable operation of the subscription-based computer;
accessing the subscription data from a security module of the subscription-based computer;
receiving a request at a network module of the security module, the request originating from the operating system of the subscription-based computer, the network including a network stack and a web server;
determining if the request is for a subscription data management user interface web page or an external computer, wherein the subscription data management user interface web page is in an operating system independent format and stored in the network module;
in response to the request for the subscription data management user interface web page:
populating the subscription data management user interface web page with the subscription data;
retrieving the populated subscription data management user interface web page from the network module; and
communicating the populated subscription data management user interface web page from the network module to a web browser in communication with the operating system; and in response to the request for the external computer, encrypting the request and sending the request to the external computer.

9. The method of claim 8, wherein the subscription data includes a number of subscription units.

10. The method of claim 9, further comprising decrementing and storing the number of subscription units during operation of the subscription-based computer.

11. The method of claim 9, further comprising modifying the number of subscription units from the subscription data management user interface web page.

12. The method of claim 8, further comprising requesting data from the web browser to a remote subscription-based computer.

13. The method of claim 8, further comprising communicating encrypted data to the web browser in response to the request for data from the external computer; and
communicating unencrypted data to the web browser in response to the request for data from the network module;
wherein the unencrypted data includes the subscription data management user interface web page.

14. A system including a secure network module in communication with a security module of a subscription-based computer, the secure network module including a network stack, a web server, and a subscription management user interface web page in an operating system independent format, at least one of the secure network module and the security module including a protected memory and a protected processor physically configured to execute computer executable code for:
accessing, decrementing, and storing a number of subscription units in the protected memory during operation of the subscription-based computer, wherein the subscription units include an amount of access time to enable operation of the subscription-based computer;
receiving a request at a network module of the security module, the request originating from the operating system of the subscription-based computer;
determining if the request is for a subscription management user interface web page or an external computer, wherein the subscription management user interface web page is in an operating system independent format and stored in the network module;
in response to the request for the subscription management user interface web page:
populating the subscription management user interface web page with the number of subscription units;
communicating the populated subscription management user interface web page to the web server; and
serving the populated subscription management user interface web page from the web server to the web browser; and
in response to the request for the external computer, encrypting the request and sending the request to the external computer.

15. The system of claim 14, further comprising modifying the number of subscription units from the populated subscription management user interface web page.

16. The system of claim 14, further comprising communicating encrypted data to the web browser in response to the request for data from the external computer; and
communicating unencrypted data to the web browser in response to the request for data from the network module;
wherein the unencrypted data includes the subscription management user interface web page.

* * * * *